United States Patent
Dickinson et al.

(10) Patent No.: US 9,420,444 B2
(45) Date of Patent: *Aug. 16, 2016

(54) ENHANCED E911 NETWORK ACCESS FOR CALL CENTERS

(71) Applicant: TeleCommunication Systems, Inc., Annapolis, MD (US)

(72) Inventors: Richard Dickinson, Seattle, WA (US); John Gordon Hines, Kirkland, WA (US); Jonathan Croy, Seattle, WA (US)

(73) Assignee: Telecommunication Systems, Inc., Annapolois, MD (US)

( * ) Notice: Subject to any disclaimer, the term of this patent is extended or adjusted under 35 U.S.C. 154(b) by 369 days.

This patent is subject to a terminal disclaimer.

(21) Appl. No.: 13/849,931

(22) Filed: Mar. 25, 2013

(65) Prior Publication Data

US 2013/0215797 A1    Aug. 22, 2013

Related U.S. Application Data

(63) Continuation of application No. 13/437,213, filed on Apr. 2, 2012, now Pat. No. 8,406,728, which is a continuation of application No. 11/354,861, filed on Feb. 16, 2006, now Pat. No. 8,150,363.

(51) Int. Cl.
*H04W 4/22* (2009.01)
*H04M 7/12* (2006.01)

(52) U.S. Cl.
CPC .............. *H04W 4/22* (2013.01); *H04M 7/1245* (2013.01); *H04M 2242/04* (2013.01)

(58) Field of Classification Search
None
See application file for complete search history.

(56) References Cited

U.S. PATENT DOCUMENTS

| 1,103,073 A | 7/1914 | O'Connel |
| 4,445,118 A | 4/1984 | Taylor et al. |

(Continued)

FOREIGN PATENT DOCUMENTS

| GB | PCT/GB00/04499 | 11/2000 |
| SE | PCT/SE98/01887 | 10/1998 |

(Continued)

OTHER PUBLICATIONS

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

(Continued)

*Primary Examiner* — Hassan Phillips
*Assistant Examiner* — Saba Tsegaye
(74) *Attorney, Agent, or Firm* — Tarolli, Sundheim, Covell & Tummino LLP

(57) ABSTRACT

An emergency call (e.g., a 911 call, an alarm company call) forwarded by a telematics call center is routed over the switched PSTN to a Voice Over Internet Protocol (VoIP) call server, where the switched call is converted to a session initiating protocol (SIP) packetized IP call for presentation to an emergency services gateway, which reconverts the call to TDM and connects to a selective router via dedicated circuits, gaining full access to the Enhanced 911 network. This provides a PSAP receiving a call from a telematics call center or other call center with all features available in an Enhanced 911 network, e.g., callback number of the 911 caller, and location of the 911 caller. Location of the caller is provided using a VoIP positioning center (VPC).

16 Claims, 3 Drawing Sheets

(56) References Cited

U.S. PATENT DOCUMENTS

| | | |
|---|---|---|
| 4,494,119 A | 1/1985 | Wimbush |
| 4,625,081 A | 11/1986 | Lotio |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemannn |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicki |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimulah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hoshen |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vanttila |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |
| 5,920,821 A | 7/1999 | Seazholtz |
| 5,922,074 A | 7/1999 | Richard |
| 5,930,250 A | 7/1999 | Klok |
| 5,953,398 A | 9/1999 | Hill |
| 5,960,362 A | 9/1999 | Grob |
| 5,974,054 A | 10/1999 | Couts |
| 5,978,685 A | 11/1999 | Laiho |
| 5,983,099 A | 11/1999 | Yao |
| 5,987,323 A | 11/1999 | Huotari |
| 5,998,111 A | 12/1999 | Abe |
| 5,999,124 A | 12/1999 | Sheynblat |
| 6,014,602 A | 1/2000 | Kithol |
| 6,014,722 A | 1/2000 | Rudin |
| 6,032,051 A | 2/2000 | Hall |
| 6,035,025 A | 3/2000 | Hanson |
| 6,049,710 A | 4/2000 | Nilsson |
| 6,052,081 A | 4/2000 | Krasner |

(56) References Cited

U.S. PATENT DOCUMENTS

| | | |
|---|---|---|
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,067,045 A | 5/2000 | Castelloe |
| 6,070,067 A | 5/2000 | Nguyen |
| 6,075,982 A | 6/2000 | Donovan |
| 6,081,229 A | 6/2000 | Soliman |
| 6,081,508 A | 6/2000 | West |
| 6,085,320 A | 7/2000 | Kaliski, Jr. |
| 6,101,378 A | 8/2000 | Barabush |
| 6,108,533 A | 8/2000 | Brohoff |
| 6,122,503 A | 9/2000 | Daly |
| 6,122,520 A | 9/2000 | Want |
| 6,124,810 A | 9/2000 | Segal |
| 6,131,067 A | 10/2000 | Girerd |
| 6,133,874 A | 10/2000 | Krasner |
| 6,134,316 A | 10/2000 | Kallioniemi |
| 6,134,483 A | 10/2000 | Vayanos |
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schneider |
| 6,178,506 B1 | 1/2001 | Quick, Jr. |
| 6,181,935 B1 | 1/2001 | Gossman |
| 6,181,939 B1 | 1/2001 | Ahvenainen |
| 6,188,354 B1 | 2/2001 | Soliman |
| 6,188,752 B1 | 2/2001 | Lesley |
| 6,188,909 B1 | 2/2001 | Alananra |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Winbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feague |
| 6,249,680 B1 | 6/2001 | Wax |
| 6,249,744 B1 | 6/2001 | Morita |
| 6,249,873 B1 | 6/2001 | Richard |
| 6,253,074 B1 | 6/2001 | Carlsson |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,092 B1 | 11/2001 | Fitch |
| 6,321,257 B1 | 11/2001 | Kotala |
| 6,324,542 B1 | 11/2001 | Wright, Jr. et al. |
| 6,327,473 B1 | 12/2001 | Soliman |
| 6,327,479 B1 | 12/2001 | Mikkola |
| 6,333,919 B2 | 12/2001 | Gaffney |
| 6,360,093 B1 | 3/2002 | Ross |
| 6,360,102 B1 | 3/2002 | Havinis |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,411,254 B1 | 6/2002 | Moeglein |
| 6,421,002 B2 | 7/2002 | Krasner |
| 6,427,001 B1 | 7/2002 | Contractor |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,526,026 B1 | 2/2003 | Menon |
| 6,529,500 B1 | 3/2003 | Pandharipande |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | fomukong |
| 6,560,534 B2 | 5/2003 | Abraham |
| 6,564,261 B1 | 5/2003 | Gudjonsson |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockheart |
| 6,687,504 B1 | 2/2004 | Raith |
| 6,691,019 B2 | 2/2004 | Seeley |
| 6,694,258 B2 | 2/2004 | Johnson |
| 6,694,351 B1 | 2/2004 | Shaffer |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |

(56) References Cited

U.S. PATENT DOCUMENTS

| | | |
|---|---|---|
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,771,742 B2 | 8/2004 | McCalmont |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermeijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke et al. |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 | 9/2005 | Simard |
| 6,940,950 B2 | 9/2005 | Dickinson et al. |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,072,667 B2 | 7/2006 | Olrik |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rousseau |
| 7,113,128 B1 | 9/2006 | Pitt |
| 7,123,693 B2 | 10/2006 | Nelson |
| 7,136,466 B1 | 11/2006 | Gao |
| 7,136,838 B1 | 11/2006 | Peinado |
| 7,151,946 B2 | 12/2006 | Maggenti |
| 7,171,220 B2 | 1/2007 | Belcea |
| 7,174,153 B2 | 2/2007 | Ehlers |
| 7,177,397 B2 | 2/2007 | McCalmont |
| 7,177,398 B2 | 2/2007 | Meer |
| 7,177,399 B2 | 2/2007 | Dawson |
| 7,177,400 B2 | 2/2007 | Eisner |
| 7,184,418 B1 | 2/2007 | Baba |
| 7,194,249 B2 | 3/2007 | Phillips |
| 7,200,380 B2 | 4/2007 | Havlark |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,246,187 B1 | 7/2007 | Ezra |
| 7,251,312 B2 | 7/2007 | D'Evelyn |
| 7,260,186 B2 | 8/2007 | Zhu |
| 7,260,384 B2 | 8/2007 | Bales |
| 7,269,428 B1 | 9/2007 | Wallenius |
| 7,302,582 B2 | 11/2007 | Snapp |
| 7,321,773 B2 | 1/2008 | Hines |
| 7,330,899 B2 | 2/2008 | Wong |
| 7,333,480 B1 | 2/2008 | Clarke |
| 7,366,157 B1 | 4/2008 | Valentine |
| 7,369,508 B2 | 5/2008 | Parantainen |
| 7,369,530 B2 | 5/2008 | Keagy |
| 7,382,773 B2 | 6/2008 | Schoeneberger |
| 7,392,240 B2 | 6/2008 | Scriffignano |
| 7,394,896 B2 | 7/2008 | Norton |
| 7,412,049 B1 | 8/2008 | Koch |
| 7,424,293 B2 | 9/2008 | Zhu |
| 7,426,380 B2 | 9/2008 | Hines |
| 7,428,571 B2 | 9/2008 | Ichimura |

(56) References Cited

U.S. PATENT DOCUMENTS

| | | | |
|---|---|---|---|
| 7,436,785 B1 | 10/2008 | McMullen | |
| 7,440,442 B2 | 10/2008 | Grabelsky | |
| 7,450,951 B2 | 11/2008 | Vimpari | |
| 7,453,990 B2 | 11/2008 | Welenson | |
| 7,495,608 B1 | 2/2009 | Chen | |
| 7,519,353 B2 | 4/2009 | Stevens | |
| 7,573,982 B2 | 8/2009 | Breen | |
| 7,602,886 B1 | 10/2009 | Beech | |
| 7,617,287 B2 | 11/2009 | Vella | |
| 7,623,447 B1 | 11/2009 | Faccin | |
| 7,702,081 B1 | 4/2010 | Klesper | |
| 7,747,258 B2 | 6/2010 | Farmer | |
| 7,764,961 B2 | 7/2010 | Zhu | |
| 7,783,297 B2 | 8/2010 | Ishii | |
| 7,787,611 B1 | 8/2010 | Kotelly | |
| 7,881,233 B2 | 2/2011 | Bieselin | |
| 7,937,067 B2 | 5/2011 | Maier | |
| 8,005,683 B2 | 8/2011 | Tessel | |
| 8,027,658 B2 | 9/2011 | Suryanarayana | |
| 8,060,389 B2 | 11/2011 | Johnson | |
| 8,150,363 B2 | 4/2012 | Dickinson | |
| 2001/0011247 A1 | 8/2001 | O'Flaherty | |
| 2001/0040886 A1 | 11/2001 | Jimenez | |
| 2002/0037735 A1 | 3/2002 | Maggenti | |
| 2002/0052214 A1 | 5/2002 | Maggenti | |
| 2002/0058515 A1 | 5/2002 | Holler | |
| 2002/0061760 A1 | 5/2002 | Maggenti | |
| 2002/0069529 A1 | 6/2002 | Wieres | |
| 2002/0077083 A1 | 6/2002 | Zellner | |
| 2002/0077084 A1 | 6/2002 | Zellner | |
| 2002/0077118 A1 | 6/2002 | Zellner | |
| 2002/0077897 A1 | 6/2002 | Zellner | |
| 2002/0085538 A1 | 7/2002 | Leung | |
| 2002/0086676 A1 | 7/2002 | Hendrey | |
| 2002/0102996 A1 | 8/2002 | Jenkins | |
| 2002/0102999 A1 | 8/2002 | Maggenti | |
| 2002/0111172 A1 | 8/2002 | DeWolf | |
| 2002/0112047 A1 | 8/2002 | Kushwaha | |
| 2002/0118650 A1 | 8/2002 | Jagadeesan | |
| 2002/0118796 A1 | 8/2002 | Menard | |
| 2002/0123327 A1 | 9/2002 | Vataja | |
| 2002/0126656 A1 | 9/2002 | Park | |
| 2002/0158777 A1 | 10/2002 | Flick | |
| 2002/0173317 A1 | 11/2002 | Nykanen | |
| 2002/0191595 A1 | 12/2002 | Mar | |
| 2003/0009277 A1 | 1/2003 | Fan | |
| 2003/0009602 A1 | 1/2003 | Jacobs | |
| 2003/0012148 A1 | 1/2003 | Peters | |
| 2003/0013449 A1 | 1/2003 | Hose | |
| 2003/0016804 A1 | 1/2003 | Sheha | |
| 2003/0026245 A1 | 2/2003 | Ejzak | |
| 2003/0037163 A1 | 2/2003 | Kitada | |
| 2003/0040272 A1 | 2/2003 | Lelievre | |
| 2003/0044654 A1 | 3/2003 | Holt | |
| 2003/0065788 A1 | 4/2003 | Salomaki | |
| 2003/0072318 A1 | 4/2003 | Lam | |
| 2003/0078064 A1 | 4/2003 | Chan | |
| 2003/0081557 A1 | 5/2003 | Mettala | |
| 2003/0086539 A1 | 5/2003 | McCalmont | |
| 2003/0096623 A1 | 5/2003 | Kim | |
| 2003/0101329 A1 | 5/2003 | Lahti | |
| 2003/0101341 A1 | 5/2003 | Kettler | |
| 2003/0103484 A1 | 6/2003 | Oommen | |
| 2003/0108176 A1 | 6/2003 | Kung | |
| 2003/0109245 A1 | 6/2003 | McCalmont | |
| 2003/0114157 A1 | 6/2003 | Spitz | |
| 2003/0118160 A1 | 6/2003 | Holt | |
| 2003/0119521 A1 | 6/2003 | Tipnis | |
| 2003/0119528 A1 | 6/2003 | Pew | |
| 2003/0137961 A1 | 7/2003 | Tsirtsis | |
| 2003/0148757 A1 | 8/2003 | Meer | |
| 2003/0153340 A1 | 8/2003 | Crockett | |
| 2003/0153341 A1 | 8/2003 | Crockett | |
| 2003/0153342 A1 | 8/2003 | Crockett | |
| 2003/0153343 A1 | 8/2003 | Crockett | |
| 2003/0161298 A1 | 8/2003 | Bergman | |
| 2003/0186709 A1 | 10/2003 | Rhodes | |
| 2003/0196105 A1 | 10/2003 | Fineberg | |
| 2003/0204640 A1 | 10/2003 | Sahineja | |
| 2003/0223381 A1 | 12/2003 | Schroderus | |
| 2004/0002326 A1 | 1/2004 | Maher | |
| 2004/0032485 A1 | 2/2004 | Stephens | |
| 2004/0043775 A1 | 3/2004 | Kennedy | |
| 2004/0044623 A1 | 3/2004 | Wake | |
| 2004/0047461 A1 | 3/2004 | Weisman et al. | |
| 2004/0068724 A1 | 4/2004 | Gardner | |
| 2004/0076277 A1 | 4/2004 | Kuusinen | |
| 2004/0098497 A1 | 5/2004 | Banet | |
| 2004/0132465 A1 | 7/2004 | Mattila | |
| 2004/0150518 A1 | 8/2004 | Phillips | |
| 2004/0152493 A1 | 8/2004 | Phillips | |
| 2004/0176123 A1 | 9/2004 | Chin | |
| 2004/0181689 A1 | 9/2004 | Kiyoto | |
| 2004/0184584 A1 | 9/2004 | McCalmont | |
| 2004/0190497 A1 | 9/2004 | Knox | |
| 2004/0192271 A1 | 9/2004 | Eisner | |
| 2004/0198332 A1 | 10/2004 | Lundsgaard | |
| 2004/0198386 A1 | 10/2004 | Dupray | |
| 2004/0203575 A1 | 10/2004 | Chin | |
| 2004/0203732 A1 | 10/2004 | Brusilovsky | |
| 2004/0205151 A1 | 10/2004 | Sprigg | |
| 2004/0229632 A1 | 11/2004 | Flynn | |
| 2004/0242238 A1 | 12/2004 | Wang | |
| 2004/0247090 A1 | 12/2004 | Nurmela | |
| 2004/0258021 A1 | 12/2004 | Kashimoto | |
| 2004/0267445 A1 | 12/2004 | De Luca | |
| 2005/0003797 A1 | 1/2005 | Baldwin | |
| 2005/0021769 A1 | 1/2005 | Kim | |
| 2005/0028034 A1 | 2/2005 | Gantman | |
| 2005/0030977 A1 | 2/2005 | Casey | |
| 2005/0039178 A1 | 2/2005 | Marolia | |
| 2005/0041578 A1 | 2/2005 | Huotari | |
| 2005/0043037 A1 | 2/2005 | Loppe | |
| 2005/0048987 A1 | 3/2005 | Glass | |
| 2005/0063519 A1 | 3/2005 | James | |
| 2005/0071671 A1 | 3/2005 | Karaoguz | |
| 2005/0074107 A1 | 4/2005 | Renner | |
| 2005/0078612 A1 | 4/2005 | Lang | |
| 2005/0083911 A1 | 4/2005 | Grabelsky | |
| 2005/0085257 A1 | 4/2005 | Laird | |
| 2005/0086467 A1 | 4/2005 | Asokan | |
| 2005/0090236 A1 | 4/2005 | Schwinke | |
| 2005/0101335 A1 | 5/2005 | Kelly | |
| 2005/0107673 A1 | 5/2005 | Ball | |
| 2005/0111630 A1 | 5/2005 | Potorney | |
| 2005/0112030 A1 | 5/2005 | Gaus | |
| 2005/0119012 A1 | 6/2005 | Merheb | |
| 2005/0134504 A1 | 6/2005 | Harwood | |
| 2005/0136885 A1 | 6/2005 | Kaltsukis | |
| 2005/0149430 A1 | 7/2005 | Williams | |
| 2005/0174991 A1 | 8/2005 | Keagy | |
| 2005/0186937 A1 | 8/2005 | Graham | |
| 2005/0190892 A1 | 9/2005 | Dawson | |
| 2005/0192822 A1 | 9/2005 | Hartenstein | |
| 2005/0201358 A1 | 9/2005 | Nelson | |
| 2005/0201529 A1 | 9/2005 | Nelson | |
| 2005/0209995 A1 | 9/2005 | Aksu | |
| 2005/0213716 A1 | 9/2005 | Zhu | |
| 2005/0232252 A1 | 10/2005 | Hoover | |
| 2005/0238156 A1 | 10/2005 | Turner | |
| 2005/0255857 A1 | 11/2005 | Kim | |
| 2005/0259675 A1 | 11/2005 | Tuohino | |
| 2005/0261002 A1 | 11/2005 | Cheng | |
| 2005/0265318 A1 | 12/2005 | Khartabi | |
| 2005/0271029 A1 | 12/2005 | Iffland | |
| 2005/0282518 A1 | 12/2005 | D'Evelyn | |
| 2005/0289097 A1 | 12/2005 | Trossen | |
| 2006/0008065 A1 | 1/2006 | Longman et al. | |
| 2006/0010200 A1 | 1/2006 | Mousseau | |
| 2006/0023747 A1 | 2/2006 | Koren et al. | |
| 2006/0026288 A1 | 2/2006 | Acharya | |
| 2006/0039539 A1* | 2/2006 | Goldman et al. | 379/45 |
| 2006/0053225 A1 | 3/2006 | Poikselka | |
| 2006/0058049 A1 | 3/2006 | McLaughlin | |

(56) References Cited

U.S. PATENT DOCUMENTS

| | | |
|---|---|---|
| 2006/0058102 A1 | 3/2006 | Nguyen et al. |
| 2006/0068753 A1 | 3/2006 | Karpen |
| 2006/0069503 A1 | 3/2006 | Suomela et al. |
| 2006/0072729 A1 | 4/2006 | Lee et al. |
| 2006/0077911 A1 | 4/2006 | Shaffer |
| 2006/0078094 A1 | 4/2006 | Breen |
| 2006/0088152 A1 | 4/2006 | Green |
| 2006/0104306 A1 | 5/2006 | Adamczyk |
| 2006/0120517 A1 | 6/2006 | Moon |
| 2006/0128395 A1 | 6/2006 | Muhonen |
| 2006/0135132 A1 | 6/2006 | Cai |
| 2006/0135177 A1 | 6/2006 | Winterbottom |
| 2006/0188083 A1 | 8/2006 | Breen |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0222151 A1 | 10/2006 | Goldman et al. |
| 2006/0233338 A1 | 10/2006 | Venkata |
| 2006/0234639 A1 | 10/2006 | Kushwaha |
| 2006/0234698 A1 | 10/2006 | Fok |
| 2006/0250987 A1 | 11/2006 | White |
| 2006/0258380 A1 | 11/2006 | Liebowitz |
| 2006/0259365 A1 | 11/2006 | Agarwal et al. |
| 2006/0281437 A1 | 12/2006 | Cook |
| 2006/0293024 A1 | 12/2006 | Benco |
| 2006/0293066 A1 | 12/2006 | Edge |
| 2007/0003024 A1 | 1/2007 | Olivier |
| 2007/0014282 A1 | 1/2007 | Mitchell |
| 2007/0019614 A1 | 1/2007 | Hoffmann |
| 2007/0021908 A1 | 1/2007 | Jaugilas |
| 2007/0022011 A1 | 1/2007 | Altberg et al. |
| 2007/0026854 A1 | 2/2007 | Nath |
| 2007/0026871 A1 | 2/2007 | Wager |
| 2007/0027997 A1 | 2/2007 | Polk |
| 2007/0030539 A1 | 2/2007 | Nath |
| 2007/0036139 A1 | 2/2007 | Patel |
| 2007/0041513 A1 | 2/2007 | Gende |
| 2007/0049288 A1 | 3/2007 | Lamprecht |
| 2007/0060097 A1 | 3/2007 | Edge |
| 2007/0081635 A1 | 4/2007 | Croak |
| 2007/0115941 A1 | 5/2007 | Patel |
| 2007/0121601 A1 | 5/2007 | Kikinis |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0263610 A1 | 11/2007 | Mitchell |
| 2007/0263611 A1 | 11/2007 | Mitchell |
| 2007/0270164 A1 | 11/2007 | Maier |
| 2007/0293205 A1 | 12/2007 | Henderson |
| 2008/0032703 A1 | 2/2008 | Krumm |
| 2008/0037715 A1 | 2/2008 | Prozeniuk |
| 2008/0063153 A1 | 3/2008 | Krivorot |
| 2008/0065775 A1 | 3/2008 | Polk |
| 2008/0081646 A1 | 4/2008 | Morin |
| 2008/0117859 A1 | 5/2008 | Shahidi |
| 2008/0160953 A1 | 7/2008 | Mia |
| 2008/0214202 A1 | 9/2008 | Toomey |
| 2009/0128404 A1 | 5/2009 | Martino |
| 2009/0310602 A1* | 12/2009 | Olshansky et al. ........... 370/352 |
| 2010/0003954 A1 | 1/2010 | Greene |
| 2010/0119049 A1 | 5/2010 | Clark |
| 2010/0198933 A1 | 8/2010 | Smith |
| 2011/0113060 A1 | 5/2011 | Martini |
| 2011/0273568 A1 | 11/2011 | Lagassey |
| 2012/0001750 A1 | 1/2012 | Monroe |
| 2012/0189107 A1 | 7/2012 | Dickinson |

FOREIGN PATENT DOCUMENTS

| | | |
|---|---|---|
| WO | WO99/22546 | 5/1999 |
| WO | WO02/11407 | 7/2001 |
| WO | PCT/US03/028369 | 10/2003 |
| WO | WO2004/098213 | 11/2004 |
| WO | PCT/US05/022090 | 6/2005 |
| WO | WO2005/051033 | 6/2005 |

OTHER PUBLICATIONS

Nars Haran, U.S. Cellular, Packet Data—Roaming and LBS Overview, Nov. 2, 2007, pp. 1-15.

Andrew Yeow, BCE, LBS Roaming Summit, Sep. 19, 2006, pp. 1-8.

Mike McMullen, Sprint, LBS Roaming Summit, Sep. 19, 2006.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

International Search Report in PCT/US2008/01441dated May 16, 2008.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

Yilin Ahao, Efficient and reliable date transmission for cellular and GPS based mayday systems, Nov. 1997, IEEE, IEEE Conference on Intelligent Transportation System, 1997. ITSC 97, 555-559.

European Search Report in Appl. No. EP06827172 dated Dec. 29, 2009.

International Search Report in PCT/US/2010/01938 dated Sep. 30, 2010.

Location Based Services V2 Roaming Support (non proprietary), 80-V8470-2NP A, dated Jan. 27, 2005, pp. 1-56.

Schulzrinne et al., Emergency Services for Internet Telephony Systems draft-schulzrinne-sipping-emergency-arch, IETF Standard Working Draft, Feb. 4, 2004, 1-22.

European Search Report in European appl. No. 06851433.0-2413 dated Aug. 8, 2008.

"Location Services (LCS); Functional Description; stage 2; ETSI TS 101 724," ETSI Standards, Jun. 2004, XP014016068, sect. 4, section 5.6.6., fig 3, sect. 7.6.2, fig. 30.

Intrado MSAG Prep for E911 Program and Documentation. Intrado Inc., Longmont, CO. Sep. 14, 2006. Acesses: Nov. 8, 2011. Idaho PSAP Standards Committee. Idaho Emergency Communications Commission, http://idahodispatch.com/index.php?option+com_ documan&task+doc_download&gid+3&itemid+7.

* cited by examiner

ENHANCED E911 NETWORK ACCESS FOR CALL CENTERS

The present invention is a continuation of U.S. patent application Ser. No. 13/437,213, entitled "Enhanced E911 Network for Call Centers", filed on Apr. 2, 2012, now U.S. Pat. No. 8,406,728; which is a continuation of U.S. patent application Ser. No. 11/354,861, entitled "Enhanced E911 Network for Call Centers", filed on Feb. 16, 2006, now U.S. Pat. No. 8,150,363, the entirety of both of which are incorporated herein by reference.

BACKGROUND OF THE INVENTION

1. Field of the Invention

This invention relates generally to E9-1-1 emergency phone calls. More particularly, it relates to emergency E9-1-1 calls using Voice Over Internet Protocol (VoIP), originating from centralized call centers.

2. Background of the Related Art 911 is a phone number widely recognized as an emergency phone number that is used by emergency dispatch personnel, among other things, to determine a location of a caller. Enhanced 911 (E911) is defined by the transmission of callback number and location information to the relevant public safety answering point (PSAP). A PSAP is the endpoint of an emergency services call. PSAPs are responsible for answering emergency services calls. E911 may be implemented for landline and/or mobile devices. Some Public Safety Access Points (PSAPs) are not enhanced, and thus do not receive the callback or location information from any phone, landline or mobile.

Many cars built today include a telematics system. The word "telematics", in its broadest sense, relates to the combination of computers and wireless telecommunications technologies. More recently, the term "telematics" has evolved to refer to automobile systems that combine global positioning satellite (GPS) tracking and other wirless communications for automatic roadside assistance and remote diagnostics. General Motors Corp. first popularized automotive telematics with its OnStar™ system. Mercedes-Benz offers a similar system called TeleAid™. The use of the word "telematics" throughout the current specification is intended to refer to the later definition of more recent recognition, i.e., to mean automotive telematics.

Many new vehicles are equipped with wireless-based telematics units providing services controlled by voice commands. One successful telematics system is available from OnStar Corp. (www.onstar.com). According to OnStar, OnStar brings together emergency service providers, wireless telephone, and satellite technologies to help protect a driver, and keep them connected on the road.

As part of the telematics system, a telematics unit including a cellular circuit is located within the vehicle, and powered by the vehicle's battery. Telematics units were originally analog-only, but have migrated to analog/digital-ready, and finally to dual-mode analog/digital. Dual-mode analog/digital telematics units operate on both the analog and digital wireless networks.

With a suitable subscription to use of a telematics operations center such as OnStar, a driver or passenger in a vehicle including a telematics unit has access to a voice-activated calling feature in their vehicle, just in case their hand-held cell phone is lost, forgotten or has a low battery. They can pre-purchase OnStar Hands-Free Calling minutes to use on the road. Such packages are typically billed to a credit card they keep on file with OnStar. They can order minutes packages by pushing the phone or white-dot button at any time.

Conventional telematics units are also capable of providing location information to a requesting wireless network, using a Global Positioning Satellite (GPS) mounted in the vehicle, or using other location technology within the wireless network. When a vehicle occupant pushes a given button in the vehicle, essentially calling the telematics operations center, the telematics operations center identifies the vehicle's location. Moreover, if their air bag deploys, the location of the vehicle can be reported to the telematics operations center. So it's only when the button is pushed to contact the telematics operations center, or when the telematics operations center is responding to an emergency signal, that the telematics operations center is provided with a location of the vehicle.

Today, most telematics companies and more generally alarm companies monitor signals from customers' car, home or business. The monitoring is usually centralized in a single location for customer locations across the country (e.g., a station in Columbus, Ohio might monitor homes throughout the country for a given monitoring company. In more global companies, an alarm or other monitoring company might monitor alarm signals from homes in the United States from a centralized command center located in Bombay, India.

Thus, in today's global economy, when a customer places an emergency call such as a 911 call (or automated alarm system emergency call), the call may be routed very far away, and in some instances half-way across the world. The telematics operator must then transfer the 911 call to the relevant 911 center (public safety access point (PSAP)). However, this transfer must take place over the Public Switched Telephone Network (PSTN) because such transfer, cannot conventionally be gained to the PSAP's existing Enhanced 911 (E911) dedicated network where location and callback number of the originating 911 caller are provided. Moreover, note that even the call related information (e.g., CallerID) provided with the call would relate to the identity and location of the centralized telematics center—not to the callback number and certainly not the location of the customer originally dialing 911.

FIG. 3 shows conventional relevant systems in an emergency 911 call made via a telematics call center.

In particular, as shown in FIG. 3, a telematics unit 101 within a car dials 911. The 911 call is serviced by a cell site of a service provider, which includes a given mobile servicing center (MSC) 102. The MSC 102 passes the 911 call on to its relevant telematics call center 104. The telematics call center 104 may be, e.g., an ONSTAR™ call center.

The operator at the telematics call center 104 that handles the 911 call of its own subscriber obtains the identity and location information of the 911 caller. Based on the current location of the 911 caller, the operator performs a query of a telematics PSAP database 106 to determine a unique 10-digit phone number of the proper local PSAP physically responsible for the location of the 911 caller.

The operator at the telematics call center 104 then forwards the 911 caller to the PSAP by dialing its 10-digit phone number via the public switched telephone network (PSTN) 110.

Unfortunately, calls that arrive at the PSAP in this manner do not include call-back number (Automatic Number Identification (ANI)) and location information (Automatic Location Identification (ALI)). Moreover, the PSTN telephone 302 at the PSAP 118 is typically not answered with the same priority as are calls that originate on its E911 network. In addition, these calls are typically not recorded or time-stamped by PSAP equipment as are calls that arrive via the E911 network.

Trials have been conducted in which a local exchange carrier (LEC) has permitted access to a selective router for the E911 network via the PSTN. In this trial, the LEC designated a specific 10-digit telephone number. A caller has their emergency call transferred to this 10-digit telephone number, which is then call-forwarded, within the central office to the selective router, which then forwards the call to the correct PSAP based upon the digits dialed. However, this solution suffers the same significant drawbacks as that shown in FIG. 3, i.e., that callback number and location are not provided to the responsible PSAP.

Other conventional technology relies on the PSAP having separate, second set of phone equipment capable of receiving proprietary data from the telematics center 104. But this solution would be prohibitively costly to implement nationwide for each telematics center, not to mention take up valuable space inside a PSAP center. Thus, the costs and disruption caused by the need for new hardware has little congestion control, making this a rather undesirable solution.

There is the need for a simple and effective solution to providing easy and full access to the Enhanced 911 network of an emergency services provider (e.g., PSAP) from users of a centralized call center, e.g, telematics call center, alarm call center, etc.

SUMMARY OF THE INVENTION

An emergency call (e.g., a 911 call, an alarm company call) forwarded by a telematics or other call center is routed over the switched PSTN to a Voice Over Internet Protocol (VoIP) call server, where the switched call is converted to a session initiating protocol (SIP) packetized IP call for presentation to an emergency services gateway (ESGW), which converts the call back to TDM and routes the call to a local selective router, thus gaining full access to the Enhanced 911 network. This provides a PSAP receiving a call from a telematics call center or other call center with all features available in an Enhanced 911 network, e.g., callback number of the 911 call center, and location of the 911 call center. Identification of the call center and the call-back number of the call center is provided using existing ALI circuits between a VoIP positioning center (VPC) and the PSAP's ALI database. The call center operator may update the VPC database with the caller's actual location and phone number, which can in turn be transmitted to the PSAP via existing ALI links.

In accordance with the principles of the present invention, a method of providing a call center with access to an Enhanced 911 network supporting a public safety answering point (PSAP) comprises determining a unique PSAP having jurisdictional responsibility for a physical current location of a caller to the call center. The caller is forwarded via a switched telephone network to a VoIP call server. The switched telephone call is converted into a session initiating protocol (SIP) packetized phone call. A VoIP positioning center is queried from the VoIP call server for call routing instructions for the SIP packetized phone call. The SIP packetized phone call is forwarded based on the call routing instructions to an emergency services gateway (ESGW) for conversion back to TDM and subsequent routing to the correct selective router.

DETAILED DESCRIPTION OF ILLUSTRATIVE EMBODIMENTS

In accordance with the principles of the present invention, an emergency call (e.g., 911 call, alarm company call) forwarded by a telematics call center is routed over the switched PSTN to a Voice Over Internet Protocol (VoIP) call server, where the switched call is converted to a packetized IP call for presentation to an emergency services gateway, gaining access to the Enhanced 911 network. Location of the caller is provided using a VoIP positioning center (VPC).

Voice Over IP (VoIP) is a technology that has been developed as an alternative telephony technology to the conventional telephony service (e.g. PSTN). VoIP takes advantage of high speed Internet data networks, and is able to provide low cost telephony services to end users. VoIP technology emulates a phone call, but instead of using a circuit based system such as the telephone network, utilizes packetized data transmission techniques most notably implemented in the Internet.

Voice-Over-Internet Protocol (VoIP) emulates a phone call, but instead of using a circuit based system such as the telephone network, utilizes packetized data transmission techniques most notably implemented in the Internet.

VoIP phone calls are routed to a VoIP voice gateway, from which they are passed on to their destination VoIP device. Conventional VoIP voice gateways (i.e., soft switches) are typically located in only a few places across the country. A soft switch is a programmable network switch that can process the signaling for all types of packet protocols. Also known as a 'media gateway controller,' 'call agent,' or 'call server,' such devices are used by carriers that support converged communications services by integrating SS7 telephone signaling with packet networks. Softswitches can support, e.g., IP, DSL, ATM and frame relay.

Because VoIP is Internet Protocol (IP) based, call related information such as CallerID type services may not be available or accurate. A location of a given VoIP device may be provisioned to be at a given geographic location, or queried from a home location register (HLR) in a mobile system.

Figure 1:
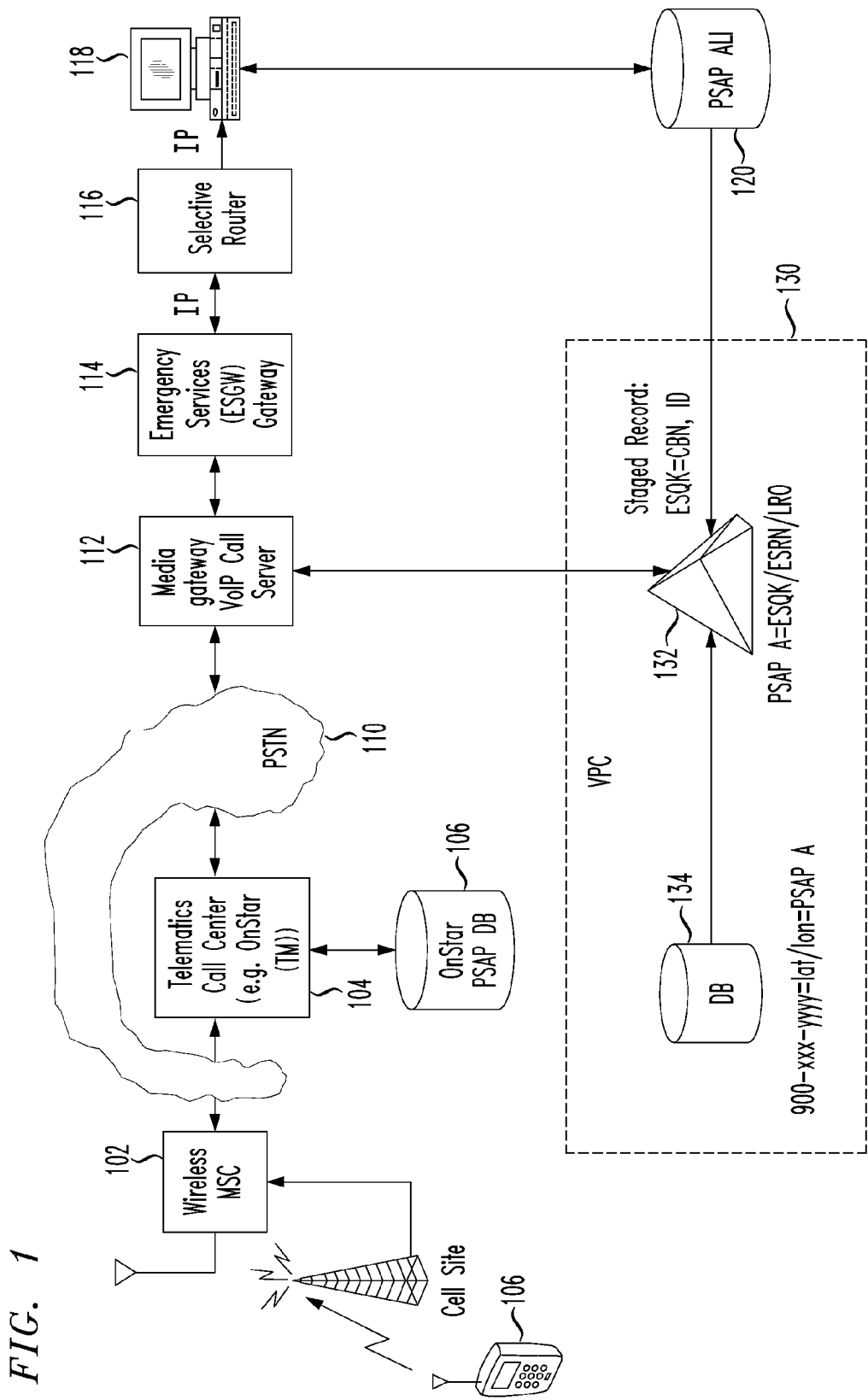
FIG. 1 shows an exemplary E911 architecture including E911 network access provided to a telematics call center or other call center, in accordance with the principles of the present invention.

FIG. 1 shows an exemplary E911 architecture including E911 network access provided to a telematics call center or other call center, in accordance with the principles of the present invention.

The present invention applies VoIP technology in lieu of the switched telephone connectivity of the PSTN to route calls to a media gateway/VoIP call server 112. The switched call is converted into a packetized call using Internet Protocol (IP), and is routed via the internet to the ESGW 114 closest to the appropriate selective router for the destination PSAP. The ESGW converts the packetized IP data back into traditional TDM, and routes the call to the intended selective router 116 via dedicated TDM trunks, where it enters the E911 network. A selective router is the node in an emergency services network that performs enhanced call routing for 911 calls.

An example will be used to further illustrate the inventive architecture. In this example, a telematics unit 101 within a car dials 911. The 911 call is serviced by a cell site of a service provider, which includes a given mobile servicing center (MSC) 102. The MSC 102 forwards the 911 call on to its relevant telematics call center 104 via the PSTN. The telematics call center 104 may be, e.g., an ONSTAR™ call center, and may be located anywhere in the country or anywhere in the world.

The operator at the telematics call center 104 that handles the 911 call of its own subscriber obtains the nature of the call, as well as the identity and location of the 911 caller. The identity and location of the 911 call from the subscriber is most often received by the call center 104 over the open phone line to their subscriber. Equipment to receive the exact location of the subscriber is expensive, but necessary only at the centralized telematics call center. The thousands of PSAPs in the country do not have the same equipment, as it would be prohibitively expensive.

Based on the current location of the 911 caller, the operator performs a query of a telematics PSAP database 106 to determine a local PSAP physically responsible for that location, as well as a unique 10-digit phone number to access the Enhanced 911 network of that PSAP.

The operator at the telematics call center 104 handling the 911 call forwards the emergency call to a given media gateway/VoIP call server 112 by dialing the designated 10-digit number for that PSAP To determine the appropriate PSAP and ESGW, the VoIP call server 112 queries a VoIP positioning center (VPC) 130. The VPC includes SIP connectivity to the VoIP call server 112. The VoIP call server 112 may also process VoIP calls. Using the 10-digit phone number dialed by the call center operator 104, the VPC queries the database 134 to determine the corresponding PSAP. The VPC then assigns an Emergency Services Query Key (ESQK) to the call and relays this routing key back to the VoIP Call Server 112.

The VoIP call server 112 passes the 911 emergency call on to an emergency service gateway ESGW 114, which in turn passes the 911 emergency call on to the desired PSAP 118. An ESGW resides in a VoIP service provider's network, and is responsible for integrating the session initiating protocol (SIP) network with the emergency services network (TDM). An ESGW 114 network includes dedicated voice trunks to selective routers in the Enhanced 911 (E911) network for any/all PSAPs being served (ideally a national network). The ESGW 114 routes 911 calls to the appropriate selective router, based on the ESRN/ESQK it receives.

The selective router 116 is provisioned with emergency services query keys (ESQKs) with ALI steering. (The ESQK is a digit string that uniquely identifies an ongoing emergency services call and is used to correlate the emergency services call with the associated data messages. It may also identify an emergency services zone and may be used to route the call through the network. The ESQK is similar to an ESRK in wireless E911 networks.)

A subscriber location database (SLDB) 134 is also provisioned. Preferably the SLDB 134 is configured so that no modifications are required to the core conventional existing VoIP E9-1-1 network. The SLDB 134 is used to relate a Session Initiated Protocol (SIP) Universal Resource Identifier (URI) or a telephone number to a PSAP.

In the given embodiments the SLDB 134 includes a listing of a series of "subscribers", in which each subscriber is really a specific PSAP with a designated 1-900-xxx-yyyy phone number. Note that the phone number does not need to be a 1-900 number as this is used as an example only. This is also a useful technique for billing the call center for this service.

In the disclosed embodiments, the address of this "subscriber" is the latitude/longitude (lat/lon) of a centroid of the jurisdiction of the relevant PSAP. Alternatively, in datbases that use tables in lieu of GIS for routing determination, the address of the "subscriber" can be any valid address within the jurisdiction of the PSAP.

Figure 2:
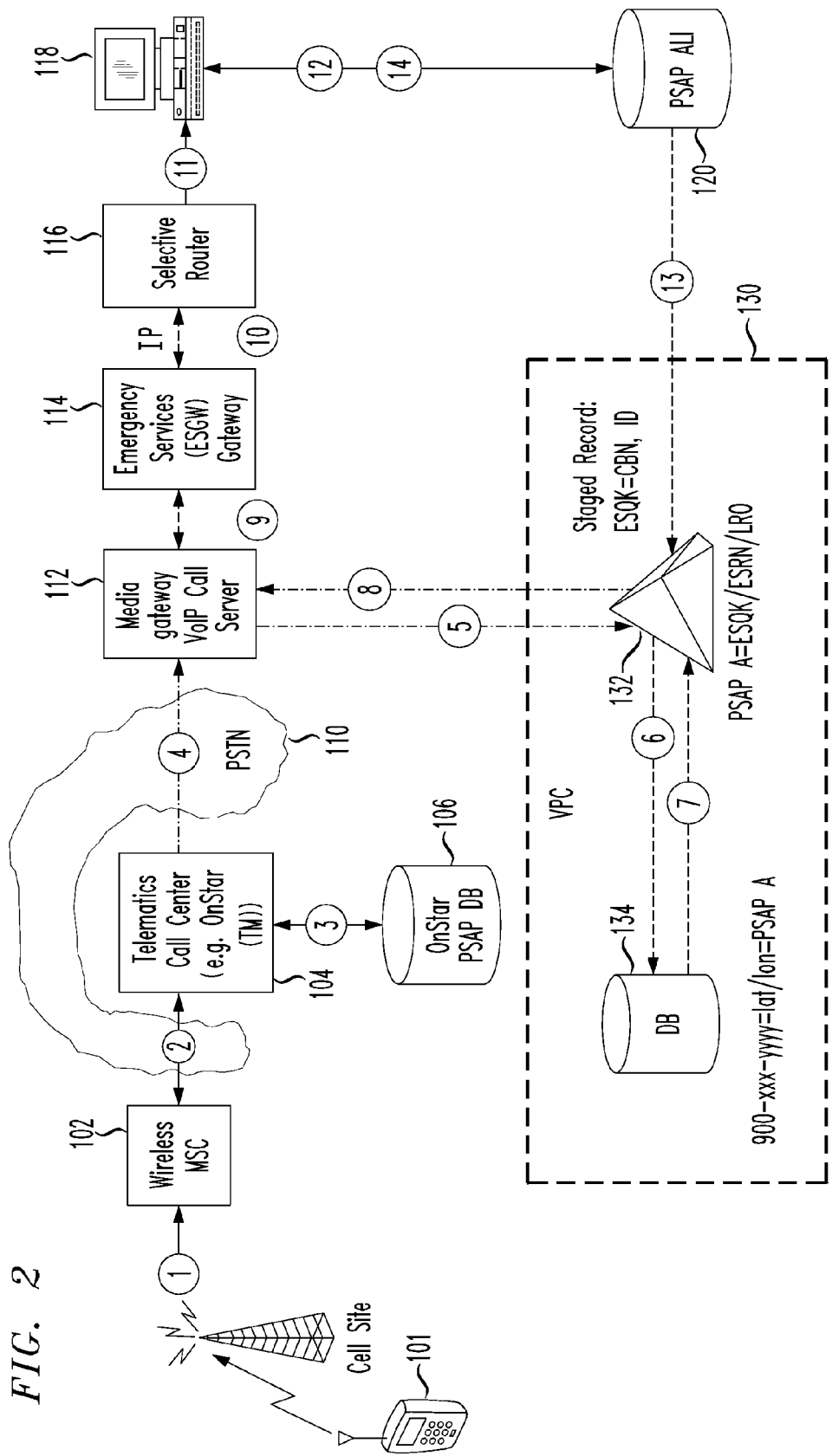
FIG. 2 shows an exemplary call flow tracing an emergency 911 call from a telematics subscriber source to the appropriate PSAP, in accordance with the principles of the present invention.
Figure 3:
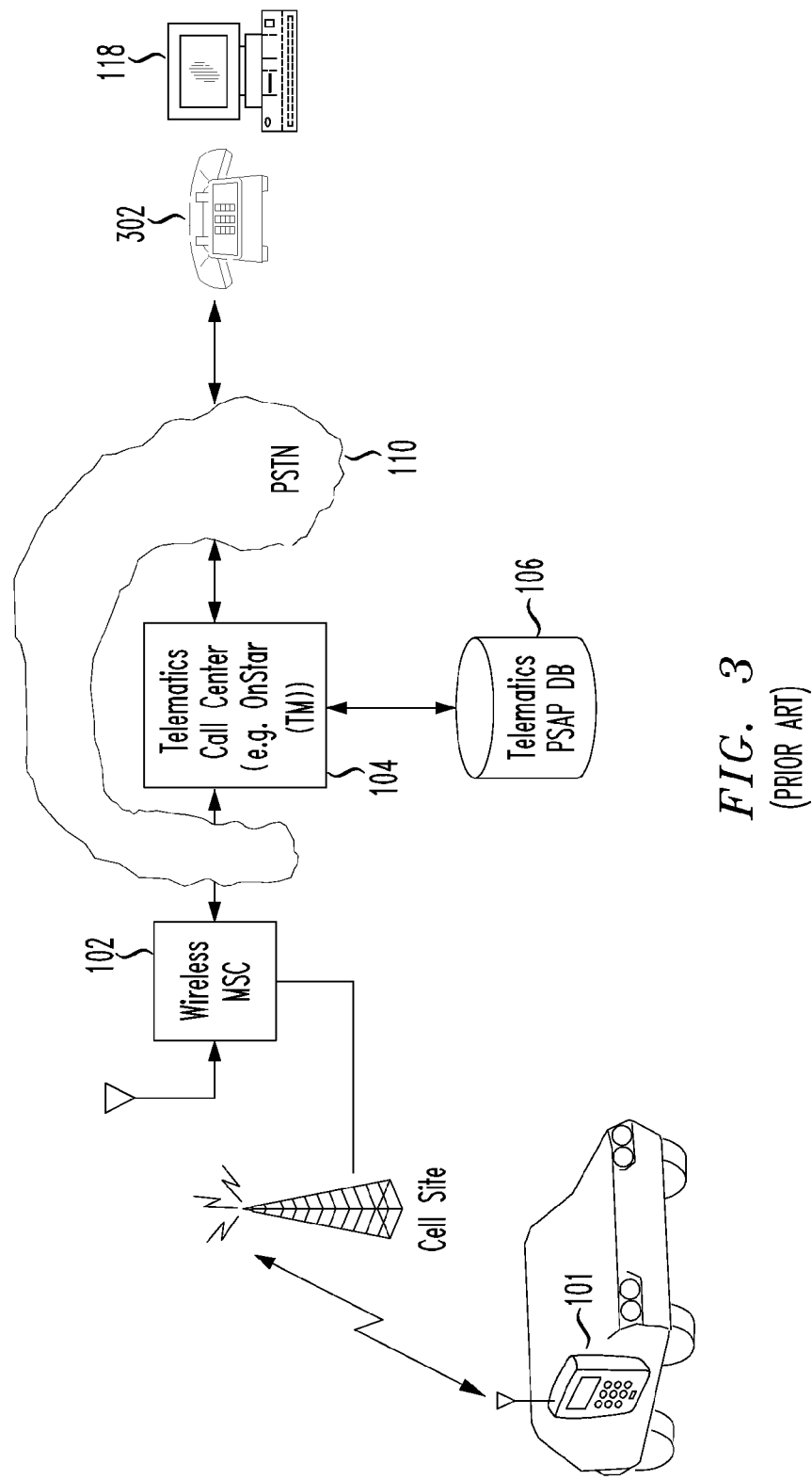
FIG. 3 shows conventional relevant systems in an emergency 911 call made via a telematics call center.

FIG. 2 shows an exemplary call flow tracing an emergency 911 call from a telematics subscriber source to the appropriate PSAP, in accordance with the principles of the present invention.

In particular, as shown in FIG. 2, a caller or automated calling device 101 contacts a local security monitoring company or roadside assistance operator or similar third party call center 104. As an example shown in step 1, a caller 101 dials 911, which is serviced through a wireless MSC 102 and passed on to the relevant telematics call center, e.g., an OnSTAR™ call center. In the given example, the wireless MSC 102 may be part of a wireless carrier's network, with the 911 call being forwarded to the relevant telematics call center 104. Alternatively, the MSC 102 may be part of a large wireless network used by the telematics company itself.

The 911 call may be placed using an SOS or similar single-press button located in a car for use in emergency situations, automatically in the event of an accident, etc. Alternatively, the phone user may simply dial 911 in a manual cell phone call from a mobile phone, either integrated into a vehicle or entirely separate from a vehicle.

In step 2, a wireless MSC 102 routes the incoming emergency call to a telematics call center 104 (e.g., an ONSTAR™ or TeleAid™ call center). In the given example this routing includes use of the PSTN 110, though this need not be the case in all applications.

The call taker at the call center 104 who receives the 911 call from the caller 101 determines that this is an emergency call that must be referred to the local 911 PSAP.

Thus, in step 3, the telematics call taker queries an existing telematics PSAP database 106 to determine the correct PSAP to which the call should be routed. Of course, to save time step 3 may be performed simultaneous with, or even prior to, the call taker's determination that the call from the mobile user 101 is an emergency call.

In step 4, a telematics dispatcher dials (could be the same person and/or equipment as the call taker) a NPA-xxx-yyyy number designated for the determined PSAP. For instance, the call taker at the call center 104 then dials 1-900-xxx-yyyy, a designated number for that PSAP 118, and prepares to conduct a conference call with the caller 101 and the PSAP 118.

The call is then routed, via the PSTN 110, to a designated VoIP call server 112. The VoIP call server 112 may be co-located with a media gateway, which serves to convert TDM to IP. The VoIP call server 112 routes the resulting IP calls much like a traditional telephone switch routes a TDM call.

The VoIP call server 112 receives the ANI (caller ID) of the call center. The VoIP media gateway 112 reformats the call from time division multiplex (TDM) or code division multiplexed (CDM) into session initiation protocol (SIP). The VoIP Call Server rearranges the dialed digits, putting the DID that was dialed in step iii (e.g., 1-900-xxx-yyyy) in the FROM field and putting the ANI of the call center into the Just-in-Time callback number (JIT CBN) field within the P-Asserted Identity in the SIP Invite. (Session initiated protocol (SIP) is an IP-based protocol defined in IETF RFCs 3261 and 2543, the entirety of which are expressly incorporated herein by reference. SIP is one of two dominant messaging protocols used by the VoIP industry.

Importantly, the VoIP Media Gateway/call server 112 converts the TDM or CDM protocol of the incoming switched network phone call to packet data using session initiation protocol (SIP), and vice versa, meaning that packetized VoIP information coming from a relevant PSAP is converted into a switched connection with the 911 caller, terminated at the VoIP call server 112.

In step 5, the VoIP call server 112 holds the call while querying the VPC 130. The Invite is received by the VPC 130 for call routing instructions.

The VPC 130 is an application that determines the appropriate PSAP, based on the location of the 911 caller 101, returns associated routing instructions to the VoIP network, and provides the call center's identity and the callback number to the PSAP through the automatic location identifier (ALI). (An ALI is a database that relates a specific telephone number to an address. This database accepts a PSAP query with a telephone number and responds with an address. In the case of an ESQK, the ALI database steers (redirects) the query to the appropriate VoIP positioning center and steers the response back to the querying PSAP).

A SIP Invite command may be used for the query from the Call Server 112 to the VPC 130. The disclosed SIP Invite command preferably includes the following parameters:
 a) The "from" field
  =the dialed digits from the call center (NPA-xxx-yyyy)
 b) The "to" field
  =911
 c) The JIT CBN field
  =callback number of the call center In step 6, the VoIP positioning center 132 queries an ERDB (SLDB) 134 for call routing instructions based upon the dialed NPA-xxx-yyyy number. The ERDB 134 relates the dialed number to the address of that phone number (lat/lon of the PSAP jurisdictional centroid) and determines the appropriate PSAP to receive the call. Within the ERDB 134, each phone number corresponds to a different PSAP.

In step 7, the ERDB 134 responds to the VPC 130 with the identity of the appropriate PSAP to serve the caller 101. The VPC 130 assigns an ESQK and emergency services routing number (ESRN) to the call and stages an ALI record. The ESRN is a 10-digit number that specifies the selective router to be used to route a call. The ALI record contains the phone number of the call center 104, based upon the ANI that accompanied the call. If the call center 104 is capable of sending the ANI of the actual end user, then this can be staged in the VPC ALI record.

Further call processing is otherwise per the conventional NENA i2 VoIP standard:

For instance, in step 8, the VoIP positioning center 130 assigns an emergency services query key (ESQK) appropriate to that PSAP, and stages a record with the call center CBN and call center company ID.

The VoIP positioning center 130 responds to the VoIP call server 112 with the ESQK, emergency services routing number (ESRN), and last routing option (LRO). (The LRO is routing information sent by the VPC 130 that provides a "last chance" destination for a call, for example the contingency routing number (CRN) or a routing number associated with a national call center.

In step 9, the VoIP call server 112 uses the ESRN to route the call to the correct emergency services gateway (ESGW) 114.

The VoIP call server 112 uses the received ESRN to determine the appropriate ESGW 114 and routes the call appropriately to the correct emergency services gateway (ESGW) 114. The ESGW 114 uses the ESRN to determine the appropriate selective router 116. For simplicity and clarity of description, only one ESGW 114 and one selective router 116 are pictured in FIG. 2.

In step 10, the ESGW 114 performs media conversion by converting the SIP protocol (and vice versa in the opposite communication direction), and uses the ESRN to route the call to the correct selective router 116, along with the ESQK.

In step 11, the selective router 116 routes the ESQK to the PSAP 118.

In step 12, the PSAP 118 queries the automatic location identifier (ALI) database 120 using the ESQK.

In step 13, the ALI database 120 steers the query to the VoIP positioning center (VPC) 130, per previously provisioned steering tables. The VPC 130 responds with a staged record that includes the callback number (CBN) and call center company ID. In the preferred embodiments, no latitude/longitude (lat/lon) is sent in the ALI record, although such data could be forwarded if it is available.

In step 14, the ALI database 120 forwards the callback number (CBN) and call center ID to the requesting PSAP 118.

In accordance with the present invention, benefits are derived by routing 911 calls via the Enhanced E911 network. Moreover, PSAPs can utilize all available technologies available to them in an Enhanced E911 network such as CAD, selective transfer, etc. when responding to a call from a telematics or other call center.

The present invention makes possible the transfer of misrouted or defaulted VoIP calls from a VoIP default call center to the appropriate PSAP via the Enhanced E911 network. In conventional systems defaulted calls must be routed via the PSTN.

This invention saves taxpayers money by allowing PSAPs to discontinue designated PSTN lines. This invention also increases the speed with which emergency services (responders) can be dispatched and provides recorded documentation of conversations that are typically available on calls received via the E911 network, but not via the PSTN.

The present invention has particular relevance for use by any alarm monitoring company, telematics call center, or emergency call center that monitors incoming calls. The invention has significant benefit in the use by automotive roadside assistance call centers like OnStar™, TeleAid, etc.

While the invention has been described with reference to the exemplary embodiments thereof, those skilled in the art will be able to make various modifications to the described embodiments of the invention without departing from the true spirit and scope of the invention.

What is claimed is:

1. A method of providing a telematics call center with access to an Enhanced 911 network supporting a public safety answering point (PSAP), comprising:
 receiving a non-packetized phone call from a telematics call center;
 converting said non-packetized phone call into an Internet Protocol (IP) based packetized phone call;
 querying a VoIP positioning center for call routing information to route said IP based packetized phone call to a particular PSAP, said VoIP positioning center query comprising a phone number of a wireless device initiating said non-packetized phone call;
 receiving said call routing information from said VoIP positioning center; and
 forwarding said IP based packetized phone call both to said particular PSAP based on said call routing information, and to said telematics call center.

2. The method of providing a telematics call center with access to an Enhanced 911 network supporting a public safety answering point (PSAP) according to claim 1, further comprising:

forwarding a Time Division Multiplexed (TDM) phone call via a dedicated trunk line to a selective router serving said particular PSAP.

3. The method of providing a telematics call center with access to an Enhanced 911 network supporting a public safety answering point (PSAP) according to claim 1, wherein:
said Internet Protocol (IP) based packetized phone call is a session initiating protocol (SIP) packetized phone call.

4. The method of providing a telematics call center with access to an Enhanced 911 network supporting a public safety answering point (PSAP) according to claim 1, wherein:
said telematics call center is one of ONSTAR™, ATX, Cross Country, or ADT.

5. The method of providing a telematics call center with access to an Enhanced 911 network supporting a public safety answering point (PSAP) according to claim 1, wherein:
said telematics call center is an alarm monitoring center.

6. The method of providing a telematics call center with access to an Enhanced 911 network supporting a public safety answering point (PSAP) according to claim 1, wherein:
said non-packetized phone call is received via a public switched telephone network (PSTN).

7. The method of providing a telematics call center with access to an Enhanced 911 network supporting a public safety answering point (PSAP) according to claim 1, further comprising:
determining a unique PSAP having jurisdictional responsibility for a physical current location of a caller to said telematics call center.

8. The method of providing a telematics call center with access to an Enhanced 911 network supporting a public safety answering point (PSAP) according to claim 1, further comprising:
receiving from said VoIP positioning center said call routing information for said IP based packetized phone call.

9. System for providing a telematics call center with access to an Enhanced 911 network supporting a public safety answering point (PSAP), comprising:
a receiver to receive a non-packetized phone call from a telematics call center;
a converter to convert said non-packetized phone call into an Internet Protocol (IP) based packetized phone call;
a physical server to query a VoIP positioning center for call routing information to route said IP based packetized phone call to a particular PSAP, said VoIP positioning center query comprising a phone number of a wireless device initiating said non-packetized phone call; and
a routing information receiver to receive said call routing information from said VoIP positioning center; and
a forwarder to forward said IP based packetized phone call both to said particular PSAP based on said call routing information, and to said telematics call center.

10. The system for providing a telematics call center with access to an Enhanced 911 network supporting a public safety answering point (PSAP) according to claim 9, further comprising:
means for forwarding a Time Division Multiplexed (TDM) phone call to a selective router serving said particular PSAP.

11. The system for providing a telematics call center with access to an Enhanced 911 network supporting a public safety answering point (PSAP) according to claim 9, wherein:
said Internet Protocol (IP) based packetized phone call is a session initiating protocol (SIP) packetized phone call.

12. The system for providing a telematics call center with access to an Enhanced 911 network supporting a public safety answering point (PSAP) according to claim 9, wherein:
said telematics call center is an ONSTAR™ call center.

13. The system for providing a telematics call center with access to an Enhanced 911 network supporting a public safety answering point (PSAP) according to claim 9, wherein:
said telematics call center is an alarm monitoring center.

14. The system for providing a telematics call center with access to an Enhanced 911 network supporting a public safety answering point (PSAP) according to claim 9, wherein:
said forwarder forwards via a public switched telephone network (PSTN).

15. The system for providing a telematics call center with access to an Enhanced 911 network supporting a public safety answering point (PSAP) according to claim 9, further comprising:
an emergency services gateway to determine a unique PSAP having jurisdictional responsibility for a physical current location of said phone call to said telematics call center.

16. The system for providing a telematics call center with access to an Enhanced 911 network supporting a public safety answering point (PSAP) according to claim 9, wherein:
said IP based packetized phone call is forwarded based on said call routing information to an emergency services gateway.

* * * * *